United States Patent [19]

Johnston et al.

[11] 4,122,991

[45] Oct. 31, 1978

[54] APPARATUS FOR ASSEMBLING SPACE STRUCTURE

[75] Inventors: James D. Johnston, Madison; Richard H. Tuggle, Jr., Huntsville; John L. Burch; Keith H. Clark, both of Decatur, all of Ala.

[73] Assignee: The United States of America as represented by the Administrator of the National Aeronautics and Space Administration, Washington, D.C.

[21] Appl. No.: 829,316

[22] Filed: Aug. 31, 1977

[51] Int. Cl.² ............................................. B64G 9/00
[52] U.S. Cl. .................................. 228/13; 228/15.1; 228/173 C; 244/159
[58] Field of Search ............... 228/173 C, 173 D, 15.1, 228/13; 114/65 R; 244/158, 159; 52/108, 749

[56] References Cited

U.S. PATENT DOCUMENTS

| | | | |
|---|---|---|---|
| 3,473,758 | 10/1959 | Webb | 52/108 X |
| 3,842,773 | 10/1974 | Kurose et al. | 114/65 R |
| 3,905,092 | 9/1975 | Houldcroft | 228/173 D |
| 4,048,936 | 9/1977 | Uchizono et al. | 114/65 R |

Primary Examiner—Al Lawrence Smith
Assistant Examiner—K. J. Ramsey
Attorney, Agent, or Firm—J. H. Beumer; J. R. Manning; L. D. Wofford, Jr.

[57] ABSTRACT

An apparatus for producing a structure in outer space from rolls of prepunched ribbon or sheet material that are transported from the earth to the apparatus located in outer space. The apparatus spins the space structure similar to a spider spinning a web utilizing the prepunched ribbon material. The prepunched ribbon material is fed through the apparatus and is shaped into a predetermined channel-shaped configuration. Trusses are punched out of the ribbon and are bent downwardly and attached to a track which normally is a previously laid sheet of material. The size of the overall space structure may be increased by merely attaching an additional roll of sheet material to the apparatus.

14 Claims, 17 Drawing Figures

APPARATUS FOR ASSEMBLING SPACE STRUCTURE

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

The present invention relates to apparatus for producing space structures, and more particularly to an apparatus hereinafter referred to as a space spider that lays or spins ribbon or sheet material into structures of lays or spins ribbon or sheet material into structures of a variety of shapes.

Heretofore, the majority of space structure assemblies concepts had a variety of disadvantages. One of the primary disadvantages is that normally the structures were constructed on earth and had to be transported to outer space. This would be both cumbersome and expensive. Since outer space structures do not require the structural strength that similar structures on earth would have to have, it is advantageous that the structure be produced utilizing a minimum amount of structural material. If the structure is produced on earth, it must be adequately packaged for transporting by a space vehicle into outer space. Then in outer space it either has to be unpacked and/or assembled or folded into the desired configuration.

SUMMARY OF THE INVENTION

The invention relates to an apparatus, hereinafter referred to as a space spider for spinning space structures of a variety of shapes from prepunched rolls of ribbon material. After the space spider has been transported to outer space it is anticipated that it will remain in outer space making it only necessary to transport prepunched rolls of material from earth to outer space. In constructing the space structure, normally a preformed core is utilized for starting the spinning of the desired space structure. It is to be understood, however, that the space spider could be programmed to produce its own core. A lower deck of the space spider is permitted to open laterally so as to enable a drive mechanism to fit on the track of the starting core. After the lower deck has been positioned on the track, it is again closed and the ends of the roll of sheet material is attached to the free end of the core.

The upper deck of the space spider has means for supporting the roll adjacent one end thereof. It also includes a sheet forming mechanism through which the roll of material is fed. As the roll of material is fed through the sheet forming mechanism it is shaped by rollers, and, in one particular embodiment trusses are punched out and bent downwardly for being attached to the track passing through the lower deck. The space spider will crawl by means of driving rollers carried in the lower deck about the rim of the established core and spin a new rim of greater circumferential diameter. By adding and attaching additional rolls of sheet material to the space spider a spiral structure can be increased to any desired size.

The space spider also includes vertically adjustable legs extending between the upper and lower decks. The height of the various legs can be adjusted relative to each other so that the ribbon of material can be fed out at a slope in order to produce a conical, dish-shaped or a variety of shaped structures.

Accordingly, it is an important object of the present invention to provide an apparatus which is capable of spinning a space structure from prepunched rolls of ribbon material.

Another important object of the present invention is to provide an apparatus which can readily produce space structures of various configurations and sizes with a minimum effort.

Still another important object of the present invention is to provide an apparatus which can be left in outer space that is self-contained and is capable of spinning or assembling a space web structure, starting from a center position and following a variety of spiral techniques for increasing the structure in circumferential diameter by merely adding additional rolls of ribbon material.

These and other object and advantages of the invention will become apparent upon reference to the following specification, attendant claims and drawings.

DESCRIPTION OF A PREFERRED EMBODIMENT

Figure 1:
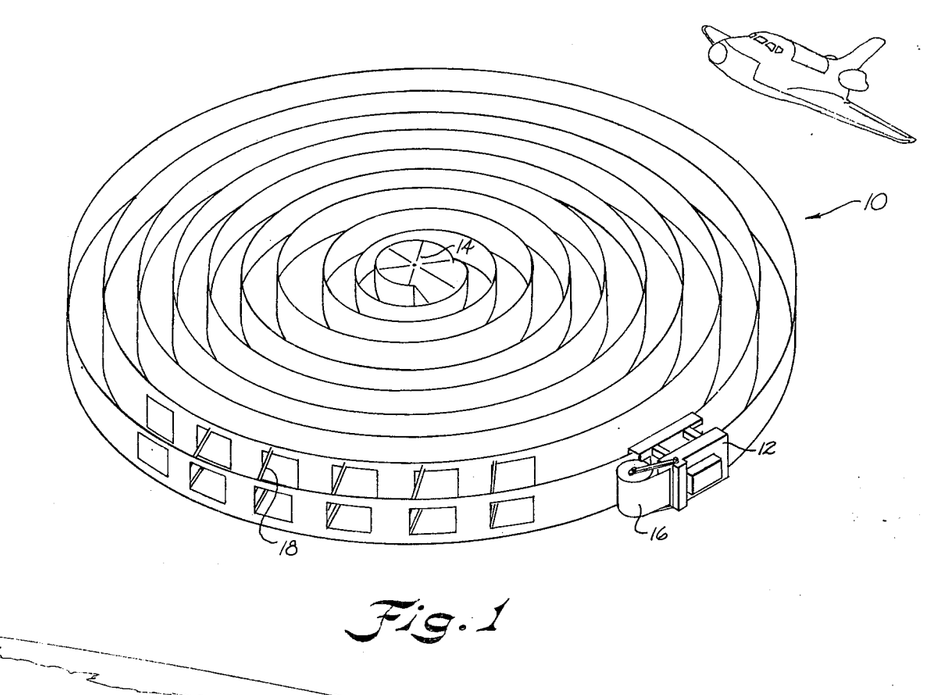
FIG. 1 is a perspective view illustrating a space spider constructed in accordance with the present invention spinning a web type space structure in outer space.

Referring in more detail to FIG. 1 of the drawings, there is illustrated a space platform, generally designated by the reference character 10, that has been spun by a space spider 12 constructed in accordance with the present invention. The space platform has an internal core 14 taking the shape of an involute. The space spider attaches one end of a roll of sheet material 16 to the end of the involute and gradually builds the space structure by increasing the circumferential diameter thereof until the space structure reaches a desired diameter. While it is spinning or laying the layers of ribbon or sheet material it also forms and welds trusses for adding support between the adjacent layers of the space structure.

Figure 2:
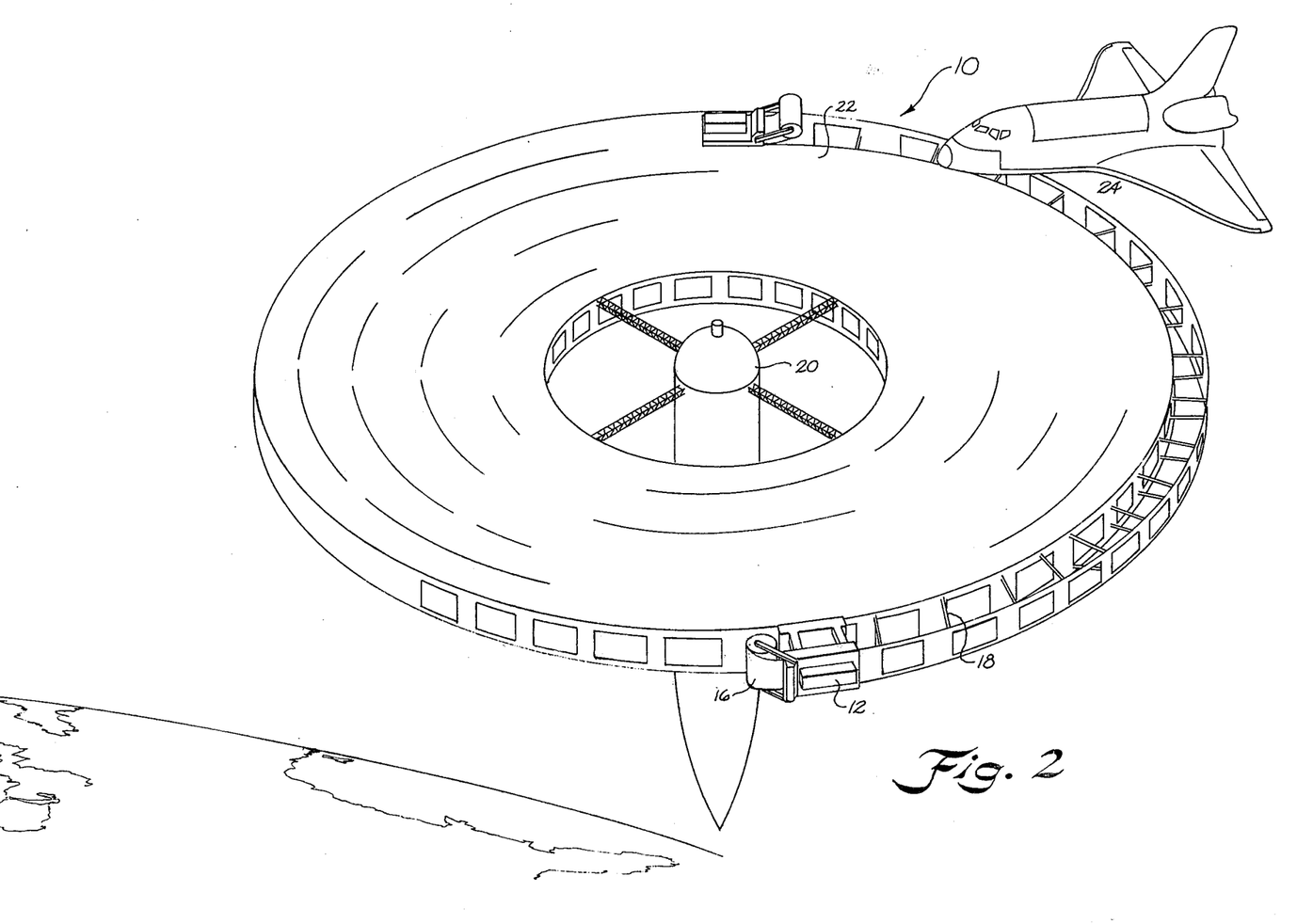
FIG. 2 is a perspective view illustrating a space spider constructed in accordance with the present invention spinning a solar collector for use in powering a satellite in outer space.

In FIG. 2, the space structure is conical in shape and is attached to an expended external tank 20 of a space vehicle such as that used by the Space Shuttle. In another space spider concept a planar surface layer 22 is laid on top of the conical web-shaped structure, and in one particular embodiment is constructed of solar cells which convert light to electricity for powering equipment carried within the external tank 20. The space structure shown in FIG. 2 is illustrated in outer space circling the earth with a space vehicle 24 approaching.

Figure 4:
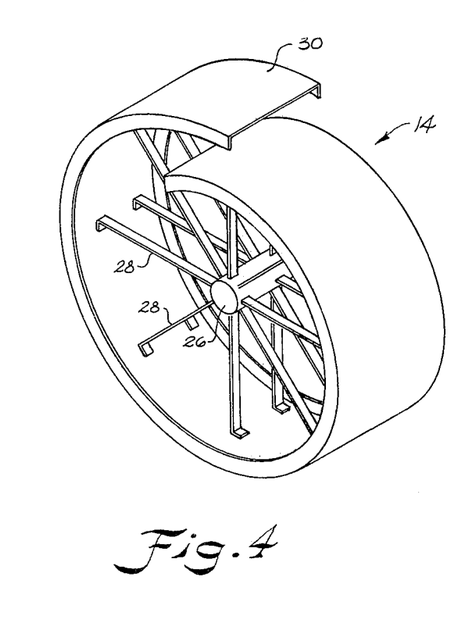
FIG. 4 is a perspective view illustrating a core to which the space spider can start from a central point in laying or spinning the space structure.

Normally, when it is desired to spin a space structure a core 14 having a involute shape, such as better illustrated in FIG. 4, is utilized. In one particular embodiment the core includes a centrally located post 26 which has radially extending spokes 28 extending outwardly therefrom. The spokes 28 increase in length as they extend around the post 26. The outer ends of the post 28 are attached to the channel-shaped truck 30. The curvature of the channel-shaped track 30 controls the curvature in the spacing between concentric layers of the sheet material forming the space structure.

Figure 3:
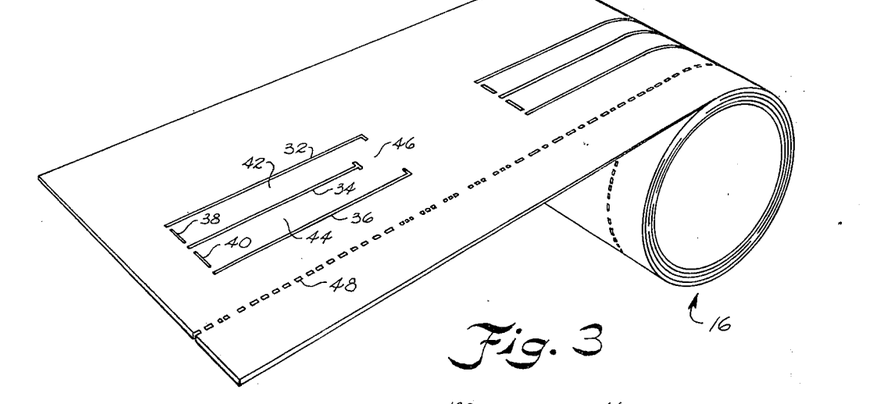
FIG. 3 is a perspective view illustrating a roll of prepunched material that is utilized by the space spider in producing structures.

A typical roll of ribbon material is illustrated in FIG. 3 and in one particular embodiment is is prepunched aluminum sheet material. The aluminum sheet material has slots 32, 34 and 36 punched therein with slots 38 and 40 punched adjacent the ends thereof. This is to enable the sections 42 and 44 to be readily pushed out from the sheet material for forming trusses. When the legs 42 and 44 are pushed out, they are pushed downwardly and bent adjacent the ends 46. The free end of the legs 42 and 44 are then welded to the track upon which the space spider is running.

Along one edge of the sheet material are punched coded holes 48 which carry information for controlling the operation of the space spider. The space spider is, in turn, equipped with a code reader which reads information off of the sheet material and, in turn, uses this information for operating the functional equipment used for controlling the operation of the space spider.

Figure 5:
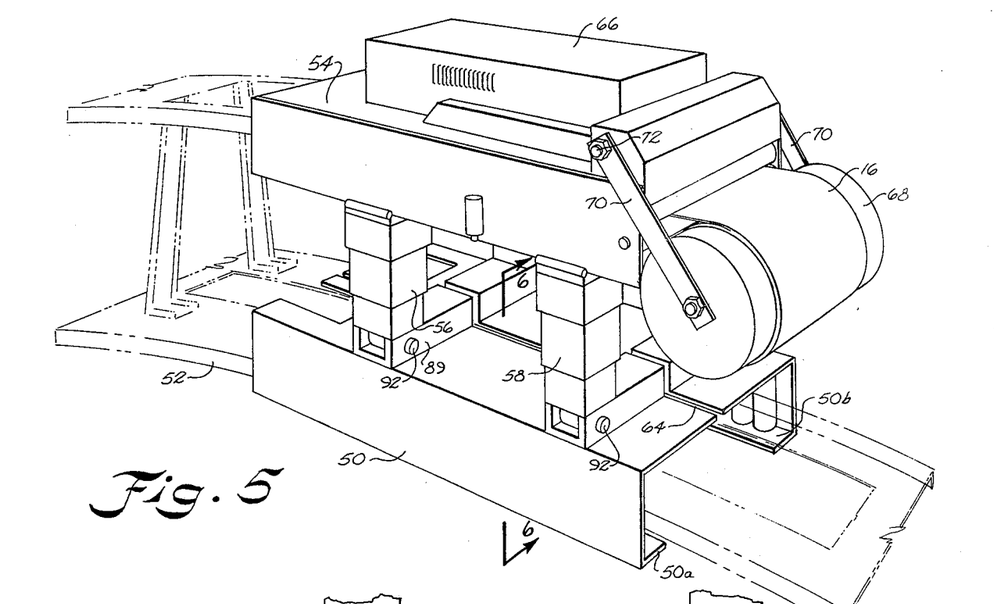
FIG. 5 is a perspective view illustrating a space spider constructed in accordance with the present invention.
Figure 5A:
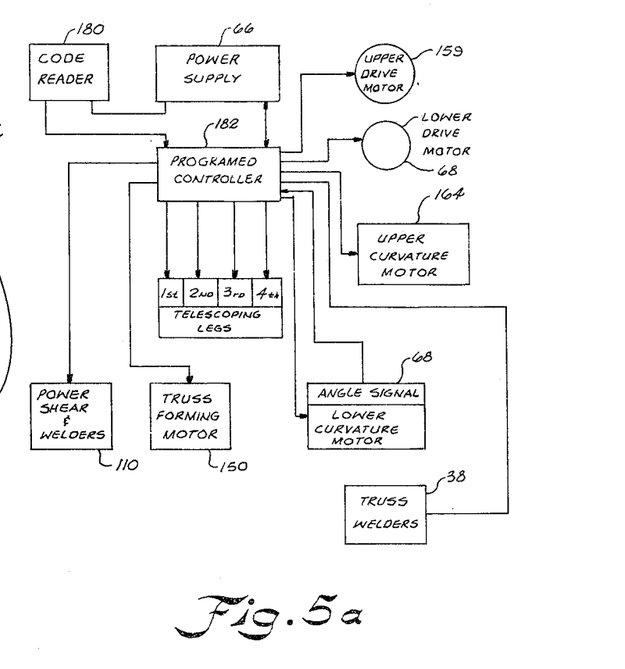
FIG. 5A is a schematic diagram in block form of the electrical system utilized with the apparatus.

In FIG. 5, there is illustrated a space spider constructed in accordance with the present invention. The space spider includes a lower deck 50 which rides on a track 52. The track 52 may be the core 14 or any other suitable track but normally, when the space spider is spinning a space structure the track 52 is a previously laid sheet or ribbon of material.

An upper deck 54 is carried directly above the lower deck 50 and is supported on telescoping legs 56, 58 60 and 62. The lower deck is split along line 64 into two halves so that the halves can be shifted laterally in order to permit the lower deck to be positioned on track 52. The mechanism for separating the two halves of the lower deck will be described in more detail in connection with FIG. 9.

Positioned on top of the upper deck is a power-pack 66 which is readily plugged into and on top of the upper deck 54. This power-pack is adapted to be interchanged so that when the batteries or power module therein run down, another powerpack can be readily substituted therefor.

The roll 16 of prepunched sheet material is carried on a spool 68 which is, in turn, rotatably carried on the end of downwardly extending arms 70. The upper ends of arm 70 are secured by means of bolts 72 to the top portion of the upper deck 54.

Figure 6:
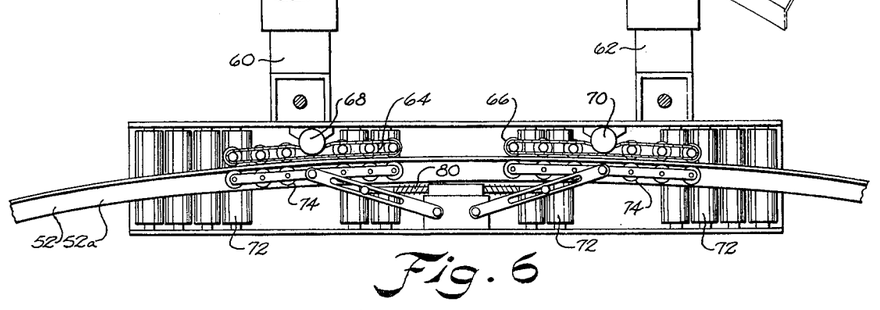
FIG. 6 is a sectional view taken along line 6-6 illustrating the drive mechanism for the lower deck of the space spider.

The drive mechanism for the apparatus is included within the lower deck and disclosed in more detail in FIG. 6. Each half of the lower deck has a driving device such as illustrated in FIG. 6, for driving on opposite sides of the track 52. Each of the driving devices includes a pair of longitudinally spaced sets of rollers 64 and 66 which are driven by means of motors 68 and 70. The motors 68 and 70 have attached thereto an angular sensing device which senses the angular position of the group of drive rollers 64 and 66. This angular sensing device, in turn, produces an electrical signal indicating the angle of the sets of rollers and feeds this signal back to a program controller to be discussed more fully later. Adjacent the side walls of the lower deck are vertically extending guide rollers 72.

The upper rollers 64 and 66 are in frictional contact with an upper surface of the track 52 for driving the space spider along the track. The track has a vertically extending flange 52a which abuts against the vertical rollers 72.

Figures 7, 8:
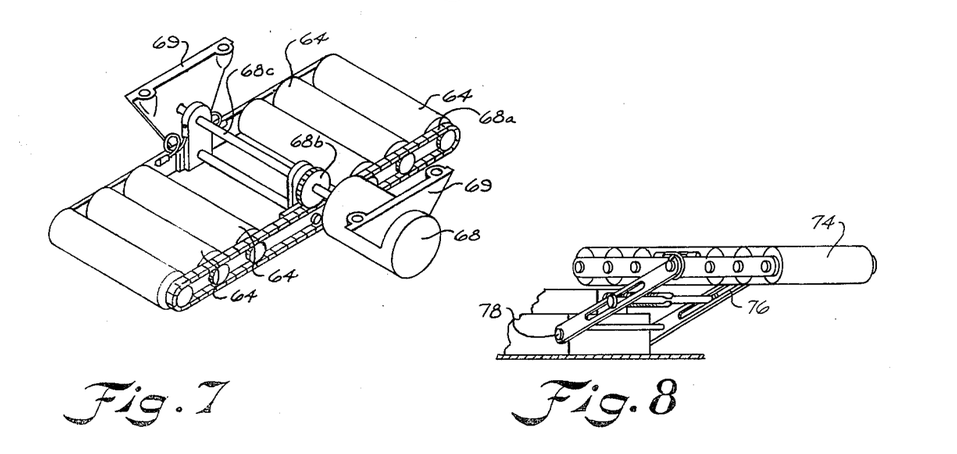
FIG. 7 is an enlarged perspective view illustrating a driving means for the lower deck for propelling the space structure over a track.
FIG. 8 is a fragmentary perspective view illustrating a set of idle rolls utilized in conjunction with the drive rolls for propelling the space spider along the track.

A set of idle rollers 74 is carried below each of the sets of drive rollers 64 and 66. These idler rollers are carried on the outer end of a pivotally supported frame 76 (FIG. 8). The inner end of the pivotal frame 76 is supported on pins 78. A worm-driven shaft 80 is connected to the pivotal member 76 for raising and lowering the idler rollers 74 when rotated. The shaft 80 is rotated by any suitable conventional electric motor responsive to signals from a program controller. Since the idler rollers 74 are pivotally supported they are able to follow the curvature of the track 52 pressing the upper surface of the track in contact with the drive rollers 64 and 66. The drive rollers 64 may be driven from the motor 68 by any suitable means such as a tooth-belt 68a which is driven by means of a sprocket 68b carried on the output shaft 68c of the motor 68. The entire assembly is supported on standards 69 which are, in turn, secured to the bottom side of the lower deck 50.

Figures 9, 10:
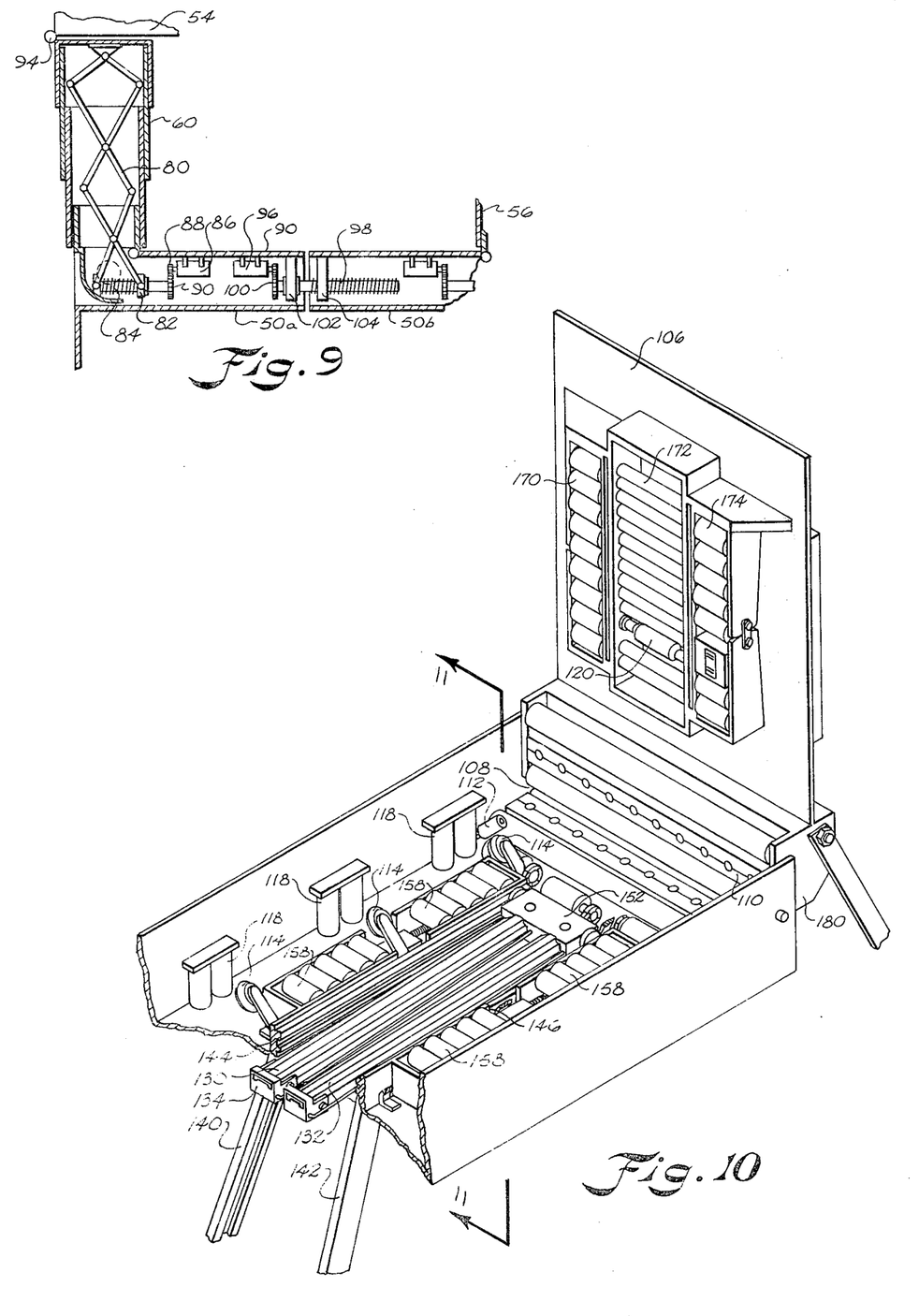
FIG. 9 is a sectional view illustrating one telescoping leg utilized in the space spider.
FIG. 10 is a perspective view with parts broken away, illustrating the upper deck of the space spider in an open position.

The legs 56, 58, 60 and 62 extending between the lower deck 50 and the upper deck 54 are telescoping so that a slope can be imparted to the material being delivered from the space spider. The telescoping legs also permit the spider to be collapsed into a smaller package for transporting into outer space. In FIG. 9 there is illustrated in cross-section, leg 60. It can be telescoped up and down in any suitable manner, and as illustrated in FIG. 9 a scissor-type of jack 80 is utilized. The lower end of the scissors is carried on a threaded sleeve 82 which is, in turn, threaded on a shaft 84. By rotating the shaft by means of a motor 86 through gears 88 and 90 the leg 60 can be raised and lowered. The lower section of the leg is secured to a horizontally extending frame member 89 by means of a pivotal joint which includes pin 92. The frame member 89 is supported on the lower deck 50. The purpose of this is to allow the legs to pivot relative to the lower and upper decks 50 and 54 when it is desired to separate the lower deck for inserting it over a track. The upper section of the telescoping leg 60 is connected by means of a hinged joint 94 to the bottom side of the upper deck 54. The two sections 50a and 50b of the lower deck can be separated by energizing electric motor 96. This electric motor 96, in turn, drives a threaded shaft 98 through gears 100. Positioned on the threaded shaft 98 are threaded collars that are, in turn, carried within post 102 and 104. The posts 102 and 104 are, in turn, fixed to the respective sections 50a and 50b. When the motor is rotated in one direction the sections 50a and 50b are separated adjacent the center line 64. When the motor 96 is rotated in the opposite direction the sections are closed for securing the track 52 therebetween.

Figure 13:
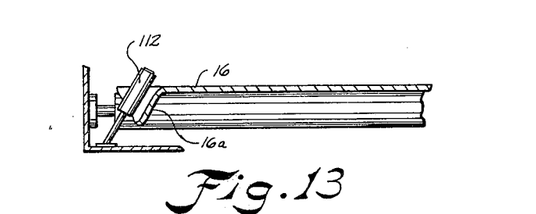
FIGS. 13 and 14 are perspective views illustrating the ribbon material being folded into a channel-forming configuration.
Figure 14:
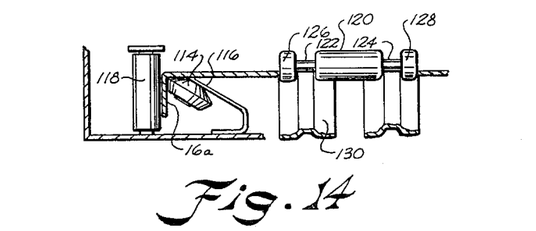

As best illustrated in FIG. 10, the upper deck 54 has a hinged top for providing access to the interior thereof. The ribbon material carried on the roll 15 is fed through a slot 108 over a welding and severing device 110. The welding and severing device are shown schematically and the purpose of the severing device is to provide a mechanism which will automatically cut the sheet material when desired. The welder is utilized for joining the ends of sheet mateial such as when it is desired to join the end of one roll with the leading edge of another roll 16 of prepunched material. As the sheet is fed into the upper deck the outer edges 16a (see FIG. 13) engage a pair of opposed inclined rollers 112 carried on opposite sides of the upper deck which starts turning the outer edges downwardly. The outer edges 16a such as illustrated in FIG. 14 then engage the disk-shaped roller 114 which is carried on an angle of approximately 45° by means of brackets 116. This roller 114, in conjunction with vertically extending rollers 118 cause the outer edge of the ribbon material 16 to be bent vertically downwardly to form the sheet material into a channel-shaped member.

Figure 12:
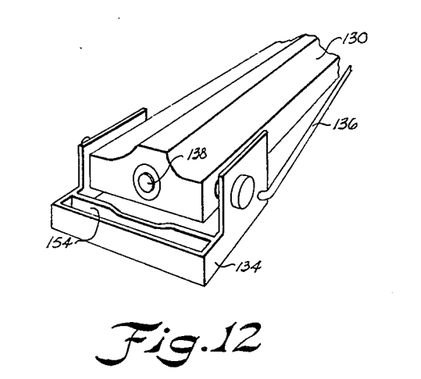
FIG. 12 is an enlarged perspective view illustrating a clamping mechanism and welder carried on the end of one of the truss forming legs.

The drive mechanism for feeding the sheet material to the upper deck will be discussed more fully later after all of the ribbon forming mechanism has been described. The center part of the sheet forming mechanism passes under a roll 120 which has reduced diameter portions 122 and 124 carried thereon. Adjacent the outer ends of the roll 120 are enlarged diameter portions 126 and 128. Positioned directly below the roll 120 are a pair of truss-forming legs 130 and 132. The truss-forming legs have upper surfaces, such as best illustrated in FIG. 12, which are complimentary in shape to the portion of the roll 120 which includes the reduced diameter portion 122. The purpose of this is that as the portion 42 of the sheet material is fed between the truss-forming roller 120 and the truss-forming leg 130, it assumes the shape of the upper surface of the truss-forming leg 130.

The forming mechanism is made up of the truss forming rollers 120 and idler rollers 172 which contain and guide the truss material. Each end of the rollers are connected to a motor-driven chain drive that make a 360 degree circuit (see FIG. 16).

Figure 16:
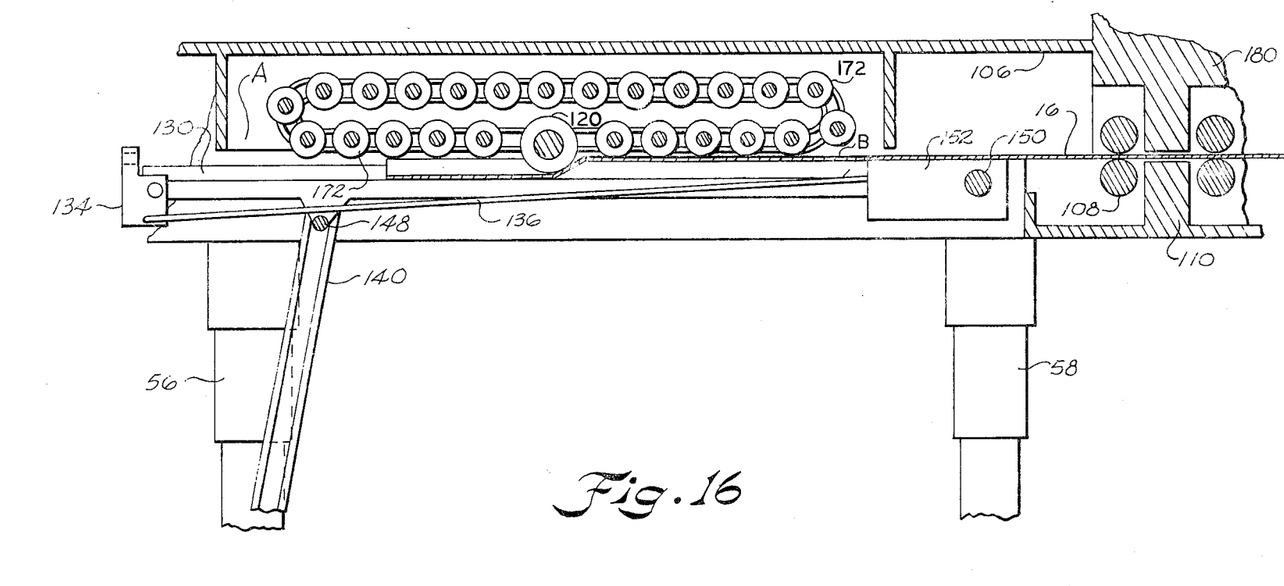
FIG. 16 is a side elevational view in schematic form of a truss forming mechanism forming part of the subject invention.

The motor-driven chain drive only engages when the prestamped trusses 42 are directly above the truss guides 130 and 132. The truss forming rollers 120 starts on the trailing end near 134, point A of the truss guide and rolls rapidly forward to the leading end of the truss guide near housing 152, point B. Once the forming roller reaches the leading end of the truss guide, housing 152, clamping mechanism 134 on the guides are actuated to hold the newly formed trusses in position. At this instant the truss guide 130 and 132 and housing 152 starts to move with the steady flow of material. The leading edge near housing 152, moves straight backward horizontally, as the trailing edge starts lowering the newly-formed trusses into position for attachment to the previously established rim 52. Once the trusses 42 make contact and connect with the established rim 52 the clamping mechanism releases, and the truss forming guides 130 and 132, and housing 152 rapidly return to the starting horizontal position to be in place for the next set of trusses. During the timeframe that the truss guides 130 and 132 are transferring the newly formed trusses 42 to the established rim 52, the forming mechanism rollers 120 and 172 moved about on the motor-driven chain drive to be in position at point A. The forming mechanism stops at this point until the next set of truss material 42 is in position for forming. This cycle is repeated until the structure is complete.

A pivotal clamping member 134 is carried adjacent the end of the truss-forming leg 130 and is folded up over the end of the leg 130 by manipulating rod 136 for bending the end of the sheet material thereover. The purpose of this is to produce a flange on the end of the truss which can be readily welded by means of the spot welder 138 carried in the end of the truss-forming leg 130.

The pivotal clamp 134 which is carried on the end of the truss-forming legs has a slot 154 provided therein. When the legs 130 are in the horizontal position such as illustrated in FIG. 10, the clamp is pivotaly upward so that the slot 154 is in a horizontal position. As a result, the end of the portion 42 of the sheet material extends therethrough in forming the truss.

Extending downwardly from adjacent the forward end of the upper deck are a pair of laterally spaced guide tracks 140 and 142. These guide tracks 140 and 142 cooperate with the horizontally extending guide tracks 144 and 146 carried within the center portion of the upper deck for guiding the truss-forming legs as they are shifted from the horizontal position illustrated in FIG. 10, to the vertically extending position illustrated in FIG. 11. Positioned on the outer end of the leg 130 is a bearing 148 which rides in the groove provided in track 140. Adjacent the other end of the leg 130 is a gear 150 which rides within a gear track carried within the groove provided in the track 144. The gear track is not illustrated for purposes of clarity. The gear 150 is, in turn, carried on the output shaft of an electric motor provided in the end of a housing 152 that is secured to truss-forming legs 130 and 132. In either the truss-forming legs 130 and 132, or in housing 152 are electric motors that drive threaded shafts for individually varying the truss-forming legs 130 and 132 lengths.

Figure 11:
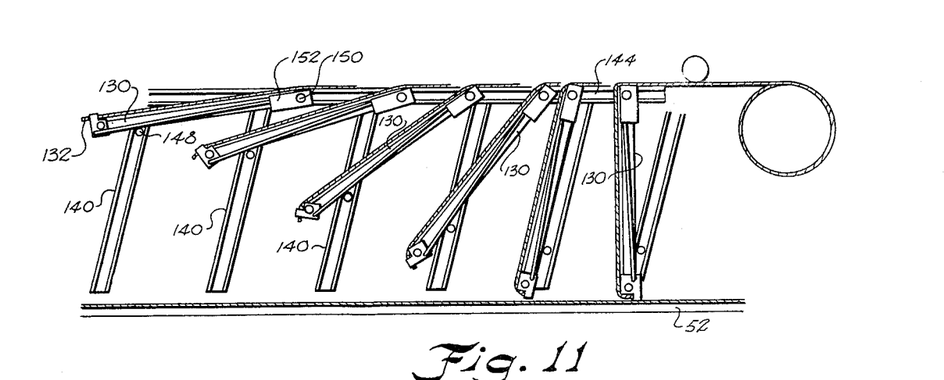
FIG. 11 is a diagramatic view illustrating the steps that the pivotal legs take in forming a truss.

Under control of the coded information 48 carried on the sheet material the motor 152 is energized. When the motor is energized the truss-forming leg begins moving to the left in the track 144 as illustrated in FIG. 10. As a result of the bearing 148 it begins to pivot in the steps from the left to the right as illustrated in FIG. 11. As it pivots the clamp 132 pivots downwardly over the end of the truss-forming leg 130 producing a flange. As it reaches the substantially vertical position such as illustrated on the right in FIG. 11, the spot welder 138 is energized to weld that truss to the lower track 52. It is to be understood, of course, that any suitable clamping mechanism could be utilized with the truss-forming leg for holding the portion of the sheet material as it is bent downwardly from the upper deck to the lower deck.

Figure 15:
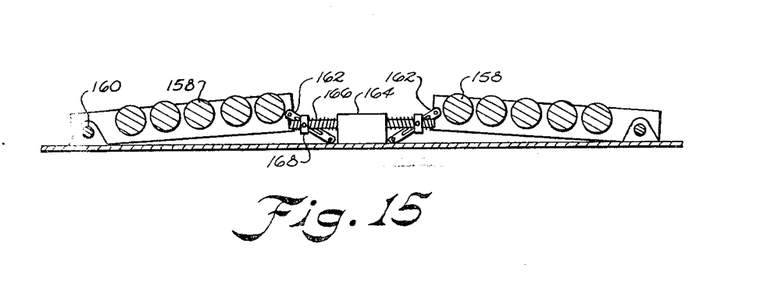
FIG. 15 is a side elevational view illustrating the manner in which the drive rollers of the upper deck may be adjusted along an arcuate path for imparting a curvature to the ribbon material.

The means for feeding the roll of sheet material through the upper deck includes a plurality of sets of drive rollers 158 that are driven by electric motors through belts or chains. The electric motor for driving the rollers 158 and belts are not shown for purposes for clarity. The angular position of the sets of rollers 158 forming the lower drive rollers to feeding the material through the upper deck can be varied. As illustrated in FIG. 15, the sets of rollers 158 are pivotally secured on brackets 160. The other ends of the sets of rollers 158 are attached to pivot arms 162. These pivot arms 162 are raised and lowered by means of an electric motor 164.

A threaded output shaft 166 is provided on the electric motor 164 and has a threaded collar 168 provided thereon. This threaded collar is, in turn, connected to the pivot arm 162. By rotating the electric motor in one direction the inner ends of the sets of rollers 158 will be raised. When the electric motor is rotated in the opposite direction the inner end of the sets of rollers 158 will be lowered. The purpose of raising and lowering the inner ends of the bearings 158 is to impart a curvature to the sheet material as it is fed through the upper deck. It is desired that this curvature correspond to the curvature of the lower track 52. As previously mentioned, an angular sensing device is associated with the drive mechanism for the apparatus carried in the lower housing and this signal is, in turn, fed through a controller for operating the electric motor 164 provided for the sheet feeding device carried in the upper housing.

The sheet 16 of prepunched material is fed between the lower rollers 158 carried in the upper housing and upper rollers 170, 172 and 174. The upper rollers 170, 172 and 174 are spring loaded to press down against the upper surface of the sheet material as it is fed through the sheet forming mechanism so that a good frictional drive is imparted to the sheet material. In some particular applications it may be desired to drive both the upper and lower sets of rollers carried in the upper housing. It is also contemplated that the prepunched sheet material could have slots punched therein so that it can be driven from a sprocket drive. The upper rollers 170 and 174 are also carried in sets which are permitted to pivot adjacent the center thereof so as to conform to the curvature of the lower rollers 158.

As illustrated in FIG. 11 and FIG. 12, the clamping mechanism 134 is controlled by means of the elongated rod 136. The upper end of the rod 136 is pivotally secured adjacent the upper end of the truss-forming leg 130 so that as the leg is pivoted downwardly it rotates the clamp from the position shown on the left hand side in FIG. 11 to the position shown on the right-hand side in FIG. 11. In the position shown on the right-hand side the clamp has moved beyond the spot welding device 138 so as to enable the spot welder to operate and weld the end of the leg to the track 52. Immediately after the welding operation takes place, the motor 150 is reversed and the leg is brought rapidly back up to the horizontal position shown in FIG. 10 for forming the next truss.

The entire operation of the space spider is under control of the coded informatin 48 carried on the prepunched sheet of material 16. This information is read off by a code reader 180 carried on the top deck closely adjacent the path traveled by the sheet material as it is fed therethrough.

The information from the code reader is, in turn, fed to a program controller 182. The program controller, in turn, connects the power supply 66 to the various motors and driving mechanism for operating the space spider. Any suitable micro-processor or program controller can be utilized with the system. In accordance with a predetermined program the power shears and welder 110 are operated to join the end of a new roll of material 16 with a previously laid roll of material.

After the ends of the material are joined the program controller activates the upper drive motor 159 which rotates the drive rollers 158 for feeding the sheet material through the upper deck. It also causes the lower drive motor 68 to be energized for causing the space spider to move along the track 52. In accordance with the coded information when a truss-forming section 42 or 44 of the sheet material approaches the truss-forming legs 130 and 132, the truss-forming motor 150 is turned on. The prepunched legs 42 and 44 which extend through the clamp 134 are then pivoted downwardly from the upper deck to the lower deck wherein the truss welder 138 carried in the foot of the legs 130 and 132 welds the truss to the track 52. The truss-forming motor 150 is then reversed retracting the legs 130 and 132 back to the horizontal position. A signal is produced by the motor 68 carried in the lower housing indicating the curvature of the track 52. This curvature signal is fed to the program controller which, in turn, causes a signal to be fed to the motor 164 carried in the upper deck for controlling the curvature of the sheet material that is being fed therethrough.

It is to be understood that the space spider can be utilized for forming many different shaped structures with minor application thereto by merely placing different programs in the program controller.

What is claimed is:

1. An apparatus for forming structures in outer space from rolls of prepunched ribbon material comprising:
    a lower deck;
    an upper deck;
    legs extending between said upper deck and said lower deck;
    means for supporting a roll of said prepunched material adjacent one end of said upper deck;
    sheet forming mechanism carried by said upper deck;
    means for feeding said material from said roll through said sheet forming mechanism for imparting a predetermined circular shape to said ribbon material defining a track; and
    drive means carried in said lower deck for propelling said apparatus on said track;
    means for synchronzing said drive means with said means for feeding said material through said sheet forming mechanism;
whereby said material is continuously formed into a predetermined shape as it is unrolled from said roll and as said apparatus is moved on said track defined by said sheet material previously fed through said sheet forming mechanism.

2. The apparatus as set forth in claim 1 wherein said means for synchronizing said drive means with said feed means comprises:
    a code reader carried by said upper deck between said roll of prepunched sheet material and said sheet forming mechanism for reading coded information carried on said sheet material; and means connecting said code reader to said means for feeding said material from said roll and said drive means for synchronziing the operation thereof.

3. The apparatus as set forth in claim 1 wherein there are four legs extending between said upper deck and said lower deck;
   means for adjusting the heights of said legs so that the sheet material can be fed from said apparatus on a slope.

4. The apparatus as set forth in claim 1 wherein said sheet forming mechanism comprises:
   a pair of laterally spaced legs carried in the path of said sheet material as said sheet material is fed through said forming mechanism;
   means for pivotally supporting one end of said pair of laterally spaced legs in said upper deck;
   means for clamping a predetermined portion of said sheet material to said legs;
   means for pivoting said legs with said sheet material clamped thereto downwardly bending said predetermined portion of said sheet material downwardly adjacent said track; and
   means for attaching said predetermined portion to said track producing a truss extending between said track and said sheet material being fed from said sheet forming mechanism.

5. The apparatus as set forth in claim 4 wherein said means for attachng said predetermined portion comprises:
   a welding device carried in a remote end of said laterally spaced legs.

6. The apparatus as set forth in claim 1 wherein said drive means comprises:
   a plurality of drive rollers engaging one surface of said track;
   a plurality of idle rollers engaging another surface of said track;
   means for rotating said drive rollers for propelling said apparatus along said track.

7. The apparatus as set forth in claim 6 wherein:
   said plurality of drive rollers includes at least two groups of longitudinally spaced rollers;
   said plurality of idle rollers including at least two groups of longitudinally spaced rollers;
   means for pivotally mounting said groups of idle rollers for permitting said rollers to follow an arcuate shaped track.

8. The apparatus as set forth in claim 7 wherein said means for feeding said material from said roll comprises:
   a plurality of material drive rollers engaging one side of said sheet material;
   a plurality of idle rollers engaging another surface of said sheet material; and
   means for rotating said material drive rollers for feeding said sheet material from said roll through said sheet forming mechanism.

9. The apparatus as set forth in claim 8 wherein:
   said plurality of material drive rollers include at least two groups of longitudinally spaced rollers; and
   means for arcuately adjusting said groups of longitudinally spaced rollers for imparting an arcuate shape to said sheet material as said material is fed thereover.

10. An apparatus for forming structures in outer space from rolls of prepunched sheet material comprising:
   a lower deck;
   drive means carried in said lowe deck for propelling said apparatus on a track;
   an upper deck;
   legs extending between said upper deck and said lower deck;
   a sheet forming mechanism carried by said upper deck;
   means for feeding said sheet material from said roll through said sheet forming mechanism;
   said sheet forming mechanism including:
      (i) means for bending the edge of said sheet at a substantially right angle to said sheet producing a truss member;
      (ii) means for bending the truss member downwardly from said sheet to adjacent said track;
   means for attaching said lower ends of said truss to said track providing support between said track and said sheet material passing through said upper deck.

11. The appatus as set forth in claim 10 wherein said means for bending said truss downwardly comprises:
   (a) a pair of laterally spaced legs carried in the path of said sheet material as said sheet material is fed through said forming mechanism;
   (b) means for pivotally supporting one end of said pair of laterally spaced legs in said upper deck;
   (c) means for clamping a predetermined portion of said sheet material to said legs; and
   (d) means for pivoting said legs with said sheet material clamped thereto downwardly bending said predetermined portion of said sheet material downwardly adjacent said track.

12. The apparatus as set forth in claim 10 further comprising:
   (a) means for imparting a predetermined curvature to said sheet material as said sheet material is fed through said sheet forming mechanism.

13. The apparatus as set forth in claim 12 wherein said means for feeding said sheet material from said roll through said sheet forming mechanism comprises:
   (a) at least two sets of longitudinally spaced rolls; and
   (b) means for driving said rolls for feeding said sheet material through said sheet forming mechanism.

14. The apparatus as set forth in claim 13 wherein said means for imparting a predetermined curvature to said sheet material comprises:
   (a) means for pivotally mounting distal ends of said two sets of longitudinal rolls; and
   (b) means for adjusting the height of the adjacent ends of said two sets of rolls for varying the curvature of said sets of rolls.

* * * * *